Feb. 1, 1966   C. H. BECKER   3,232,651
FASTENING CLIP
Filed June 4, 1963
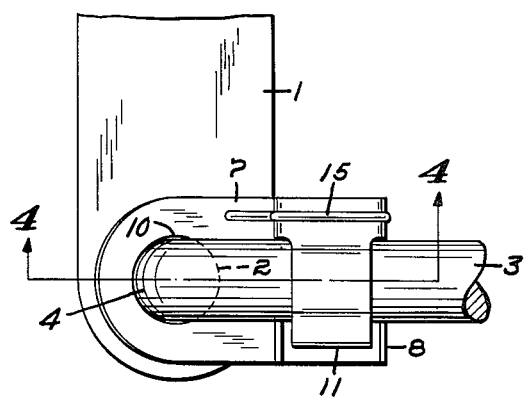
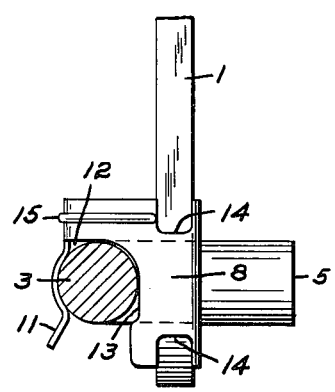
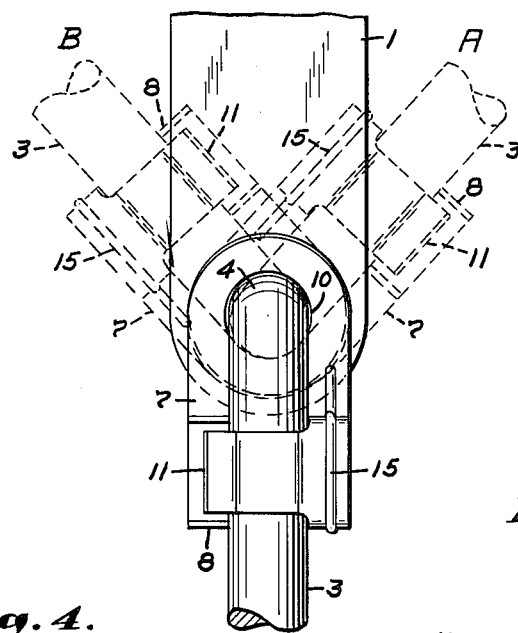
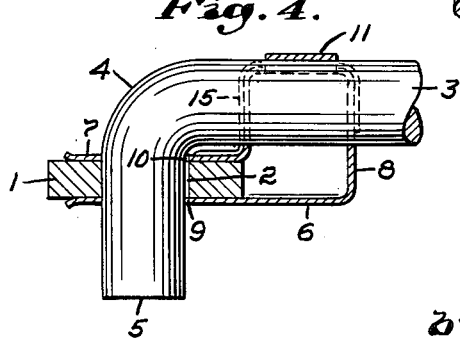
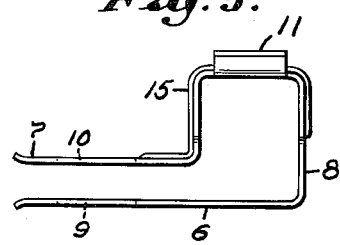
Inventor:
Charles H. Becker,
by Walter S. Jones
Atty.

3,232,651
FASTENING CLIP
Charles H. Becker, Braintree, Mass., assignor to United-Carr Incorporated, a corporation of Delaware
Filed June 4, 1963, Ser. No. 285,517
2 Claims. (Cl. 287—93)

This invention is directed to a fastening clip for fastening a pair of pivotally associated members and is an improvement on the clips disclosed by United States Patent to Andre J. E. Roualet, No. 1,966,599, issued July 17, 1934. Clips like those shown in FIGS. 2, 3, and 4 of that patent have been made and sold, particularly to the automotive trade, as rod end clips in both left and right hand constructions.

An object of the present invention is to provide a simple clip for holding together a pair of pivotally related members; the clip being in the form of a pair of spaced superposed arms connected at one end with a spring finger provided as a part of one of the arms, and co-operating aligned apertures adjacent the free ends of the arms whereby the clip may adapt itself to wide variation of angles between the two parts to be pivotally associated and to reduce the clip to a minimum size.

In the drawings which illustrate a preferred embodiment of the invention:

FIG. 1 is a plan view of a pair of pivotally associated members at right angles to each other and held in assembly by the improved fastening clip;

FIG. 2 is an edge view of the construction shown in FIG. 1 as viewed from the right hand side thereof;

FIG. 3 is a view of the construction shown in FIG. 1 with the pivotally associated members in alignment with each other and showing two dotted extreme positions (left and right) of the rod and clip to the lever;

FIG. 4 is a section taken on the line 4—4 of FIG. 1; and

FIG. 5 is a front elevational view of the clip member per se.

The fastening clip illustrated in the drawings, and to be described hereafter, is simple, compact, inexpensive and adapts itself to the pivotal assembly of two members somewhat universally; whereas the commercial clips like those shown in FIGS. 2, 3, and 4 of the Roualet patent referred to above, have been made in right and left hand constructions because one of them would not adapt itself as universally as the present clip.

As an example of the utility of the present fastening clip there is illustrated a lever 1, or the like, of appreciable width having an aperture 2 in combination with another pivotal member 3 in the form of a rod and having a bend 4 to provide an aperture engaging portion 5 as shown in FIG. 4.

The improved fastening clip for attaching the members 1 and 3 in pivotal arrangement is formed of springy material and has a pair of spaced superposed arms 6 and 7 joined by a connecting portion 8 and having a aligned apertures 9 and 10 adjacent their free ends as shown in FIGS. 4 and 5.

The fastening clip is also provided with a spring finger 11 preferably taken from material of the arm 7 and shaped to make holding engagement with the pivotal member 3 as shown in FIG. 2. The clip is also provided with a notch 12 (FIG. 2) which is located in the connecting portion 8 and shaped so that a cut out edge 13 adjacent the notch 12 co-operates with the spring finger 11 to make holding engagement with the rod 3.

The connecting portion 8 of the clip is also provided with opposed notches 14—14 (FIG. 2) which may receive the lever member 1 thereby permitting greater relative movement between the pivotally associated members 1 and 3.

There is also provided a stiffening bead 15 in the arm 7 and connecting portion 8 to strengthen the device due to the fact that the upper arm is weakened because of the formation of the spring finger and various notches.

Assembly of the pivotally associated members 1 and 3 by the use of the improved clip is simple since it is only necessary to first place the clip over the lever 1 so that the holes 9 and 10 in the clip arms are in alignment with the aperture 2 in the lever 1 and then the bent end 5 of the other pivotal member or rod 3 is inserted through the apertures 2, 9, and 10. Thereafter, either the clip or the rod 3 is moved laterally to complete the installation depending upon the type of application involved. In any event the rod 3 and clip are moved relative to each other so that the rod 3 enters the notch 12 and snaps into engagement with the spring finger 11 and the cutout edge 13 thereby holding the parts in secure assembly. Thereafter, the members 1 and 3 may pivot relative to each other from a position A shown in dotted lines in FIG. 3, to a position B also shown in dotted lines in FIG. 3. Thus it will be seen that this simple, inexpensive fastening clip will adapt the pivotal relationship of the members 1 and 3 in any angular degree, with relation to each other, between the positions A and B.

While there is illustrated and described one embodiment of the invention it should be understood that the device is best described by the following claims.

I claim:

1. A fastener clip for fastening a pair of pivotally associated members, said clip having first and second arms in spaced parallel relation to each other and one of which is longer than the other, and each of said arms having a free end provided with an aperture and said apertures being aligned and said arms being adapted to engage opposite sides of one of the pivotal members and the first of said arms having at its other end an L-shaped end wall extending substantially normally therefrom toward the plane of said second arm, said second arm having at its other end an end wall extending substantially normally therefrom in a direction away from said first arm, said end wall being in spaced alignment with said L-shaped end wall, said L-shaped end wall and said end wall being connected by a bridge portion, which is substantially the width of the end wall of the second arm and which extends between said end wall of said second arm and the end of one leg of said L-shaped end wall, said bridge portion having a spring finger extending therefrom in spaced relation with said first and second arms.

2. A fastener clip as set forth in claim 1 wherein said L-shaped end wall includes a pair of spaced notches adjacent to the connection between said L-shaped end wall and said first arm.

References Cited by the Examiner

UNITED STATES PATENTS

| | | | |
|---|---|---|---|
| 1,966,599 | 7/1934 | Roualet | 287—93 |
| 2,578,639 | 12/1951 | Bedford Jr. | 287—93 |
| 2,961,261 | 11/1960 | Fernberg et al. | 287—93 |
| 3,102,745 | 9/1963 | Engelmann | 287—93 |

CARL W. TOMLIN, *Primary Examiner.*

THOMAS F. CALLAGHAN, *Examiner.*